(12) United States Patent
Lee et al.

(10) Patent No.: US 12,099,919 B2
(45) Date of Patent: Sep. 24, 2024

(54) ON-CHIP TRAINING NEUROMORPHIC ARCHITECTURE

(71) Applicant: Seoul National University R&DB Foundation, Seoul (KR)

(72) Inventors: Jong-Ho Lee, Seoul (KR); Dongseok Kwon, Seoul (KR); Jangsaeng Kim, Ulsan (KR)

(73) Assignee: SEOUL NATIONAL UNIVERSITY R&DB FOUNDATION, Seoul (KR)

(*) Notice: Subject to any disclaimer, the term of this patent is extended or adjusted under 35 U.S.C. 154(b) by 935 days.

(21) Appl. No.: 17/141,394

(22) Filed: Jan. 5, 2021

(65) Prior Publication Data

US 2021/0232900 A1  Jul. 29, 2021

Related U.S. Application Data

(60) Provisional application No. 62/957,482, filed on Jan. 6, 2020.

(51) Int. Cl.
*G06N 3/04* (2023.01)
*G06N 3/063* (2023.01)
*G06N 3/084* (2023.01)

(52) U.S. Cl.
CPC .............. *G06N 3/063* (2013.01); *G06N 3/04* (2013.01); *G06N 3/084* (2013.01)

(58) Field of Classification Search
None
See application file for complete search history.

(56) References Cited

U.S. PATENT DOCUMENTS

| 10,332,004 B2 | 6/2019 | Kataeva et al. |
| 2017/0011290 A1 | 1/2017 | Taha et al. |
| 2017/0017879 A1 | 1/2017 | Kataeva et al. |

FOREIGN PATENT DOCUMENTS

| KR | 20170080440 | 7/2017 |
| KR | 20180028966 | 3/2018 |

(Continued)

OTHER PUBLICATIONS

Shahsavari, et al., Spiking Neural Computing in Memristive Neuromorphic Platforms, Springer Nature, Handbook of Memristor Networks, 2019, pp. 1-38 (Year: 2019).*

(Continued)

*Primary Examiner* — Wilbert L Starks
(74) *Attorney, Agent, or Firm* — CANTOR COLBURN LLP

(57) ABSTRACT

A neuromorphic system enabling on-chip training includes: synapse arrays where synapse devices are arranged in a cross-bar shape; a final neuron layer including a forward neuron and a backward neuron and connected to an output terminal of a last synapse array; neuron layers including a forward neuron, a backward neuron, and a memory storing signals used during a weighted value update operation of a neural network and arranged between the remaining synapse arrays except for a first and last synapse arrays; and an error calculation circuit detecting and outputting an error value of a target signal and an output signal of the forward neuron of the final neuron layer. Conductances of the synapse devices represent weighted values of the neural network and are changed by the weighted value update operation. Each synapse device is configured with a flash device, and the neuron layers are implemented with ultra-miniature devices.

13 Claims, 12 Drawing Sheets

(56) References Cited

FOREIGN PATENT DOCUMENTS

| | | |
|---|---|---|
| KR | 20190133532 | 12/2019 |
| KR | 20200076083 | 6/2020 |

OTHER PUBLICATIONS

Zhang, et al., Neuromorphic Computing with Memristor Crossbar, Phys. Status Solidi A2018,215, 1700875, 2018, pp. 1-16 (Year: 2018).*

Rajendran, et al., Low-Power Neuromorphic Hardware for Signal Processing Applications, IEEE Signal Processing Magazine, Nov. 2019, pp. 97-110 (Year: 2019).*

* cited by examiner

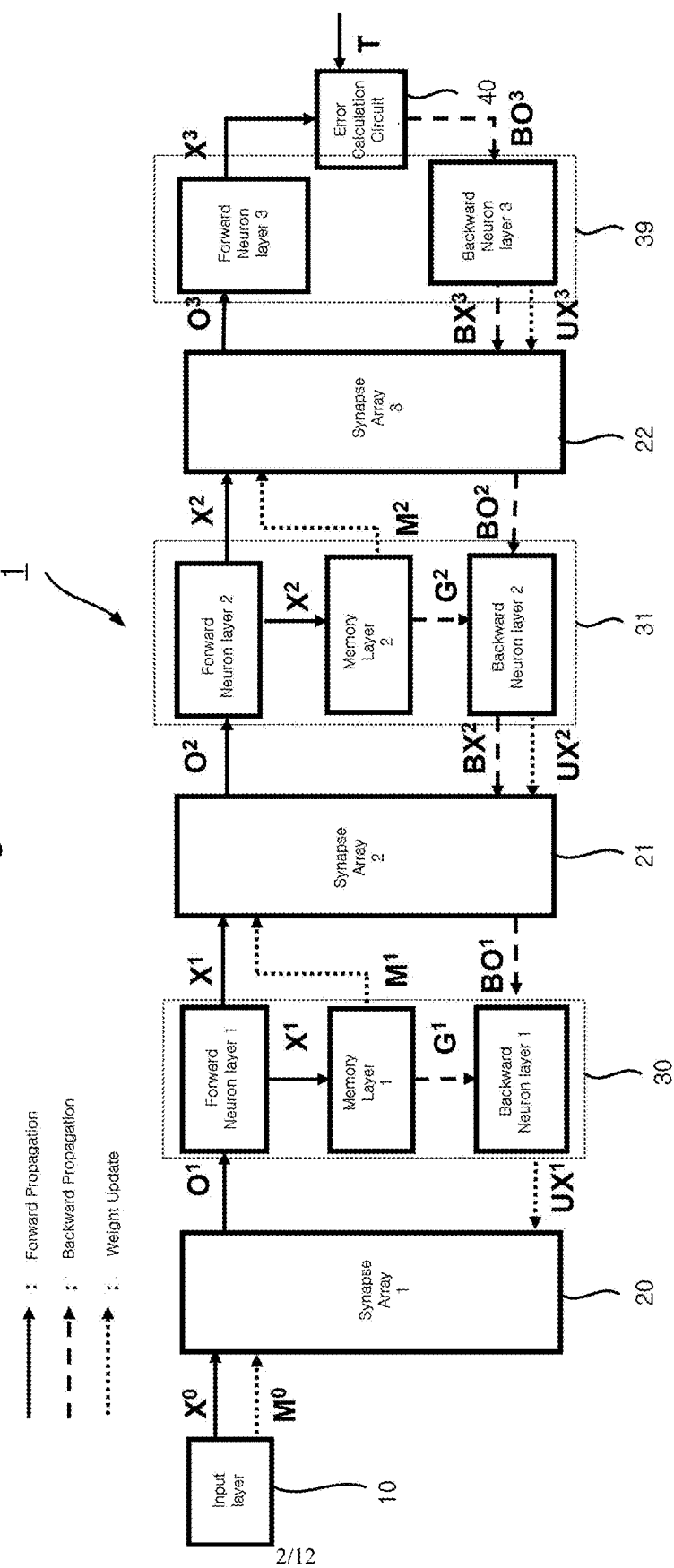

ON-CHIP TRAINING NEUROMORPHIC ARCHITECTURE

BACKGROUND OF THE INVENTION

1. Field of the Invention

The present invention relates to a neuromorphic system enabling on-chip training, and more particularly, to a compact neuromorphic system enabling on-chip training, reducing power consumption, and minimizing usage of memories by implementing a forward propagation phase, a backward propagation phase, and a weighted value update phase of a neural network by hardware using small-sized, low-power-consumption circuits.

2. Description of the Related Art

In recent years, many approaches have been made to imitate nervous systems of animals as power consumption has increased significantly and heat release problems have become more serious in integrated circuits based on the von Neumann architecture. Particularly, in the techniques imitating the nervous systems of animals, it is possible to improve the cognitive function and the determining function by enabling cognitive function and learning while greatly reducing power consumption. As a result, there is an opportunity to replace or greatly improve the functionality of the existing von Neumann integrated circuits. Therefore, much attention has been increasingly paid to the technique, and the need for research has been greatly increased.

The basic function of neurons is to generate electrical spikes and transmit information to other cells in a case where a stimulus exceeds a threshold value. The resulting electrical signal is called an action potential. Neurons may be roughly divided into three portions. The neuron includes a nerve cell body where a nucleus exists, a dendrite which receives a signal from another cell, and an axon which transmits a signal to another cell. A portion which transmits a signal between the dendrites is called a synapse.

The neuron receives a stimulus from another nerve cell or a stimulus receptor cell and transmits the stimulus to another nerve cell or a glandular cell. Exchanging the stimulus occurs at the synapse. One nerve cell (neuron) receives stimuli through a number of synapses and integrates the excitations, and after that, the nerve cell transmits an electrical spike to an axon near to the nerve cell body, so that the electrical spike reaches the synapse.

In this manner, the transmission of the excitations from the neuron through the synapses to another nerve cell is referred to as excitation transmission. The excitation at the synapse is transmitted only from a nerve fiber toward a nerve cell body or a dendrite and is not transmitted in the reverse direction, so that the excitation is transmitted in only one direction as a whole.

In addition, the synapses are not only relay sites that transmit the excitations but the synapses also cause weighting or inhibition according to temporal or spatial change in excitations reaching the synapses to enable higher level integration of the nervous system.

On the other hand, besides the synapses having the action of transmitting the excitation, there are synapses having the action of inhibiting the transmission of the excitations from other nerve cells. These synapses are called inhibitory synapses. When the excitation transmitted along some nerve fibers reaches the inhibitory synapse, the inhibitory transmitting material is secreted from the synapse. This inhibitory transmitting material acts on a cell membrane of the nerve cell connected to the synapse to inhibit the excitations of the cell from occurring (occurrence of an action potential). As a result, while the inhibitory transmitting material acts, the excitation reaching other synapses is not transmitted to the synapse.

Recently, various researches on implementing artificial neural networks have been made. Artificial intelligence operations that need to be implemented in the artificial neural networks require large-scale parallel computations such as weighted sum. However, in von Neumann-based structure of the related art, the computation are serially performed through communication between a memory and a processor. In the case of performing the artificial intelligence operation in such a manner of the related art, power consumption is large, and in a process of exchanging data with an external memory, not only a speed becomes slow, but also power consumption increases.

In particular, the artificial neural network may be configured to perform only off-chip training by performing only forward propagation and performing inference or recognition or may be configured to perform on-chip training by performing both forward propagation and backward propagation and on-chip training and performing weight-update.

US Patent Publication US 2017-0011290A1 discloses a neuromorphic architecture that performs on-chip training. However, there is a problem that the system disclosed in the US patent application uses circuits that require a lot of power consumption and require a large area, such as Op-Amp, analog-to-digital converters (ADCs), and digital-to-analog converters (DACs). There is a problem that these circuits cause the system to become more inefficient as the size of the network increases. Therefore, there is an increasing demand for a neuromorphic architecture that solves these problems and obtains excellent performance at the same time.

SUMMARY OF THE INVENTION

The invention is to provide a neuromorphic system being configured by using devices that minimize memory usage and reduce power consumption and area consumption and enabling on-chip training by performing all phases of a forward propagation phase, a backward propagation phase, and a weighted value update phase by hardware.

According to an aspect of the invention, there is provided a neuromorphic system including: one or more synapse arrays in which synapse devices having a preset conductance are arranged in a cross-bar shape: an input layer that supplies an input signal to a first synapse array: a final neuron layer that includes a forward neuron configured to perform a forward propagation operation of a neural network and a backward neuron configured to perform a backward propagation operation of the neural network and is connected to an output of a last synapse array: one or two or more neuron layers that include a forward neuron configured to perform the forward propagation operation of the neural network, a backward neuron configured to perform the backward propagation operation of the neural network, and a memory that stores signals used during a weighted value update operation of the neural network and are arranged between the remaining synapse arrays except for the first synapse array and the last synapse array; and an error calculation circuit that is input with a target signal and an output signal of the forward neuron of the final neuron layer and detects and outputs an error value between the input target signal and the input output signal of the final neuron layer, wherein conductances of the synapse devices represent weighted values of the neural network and are changed by weighted value update operation.

In the neuromorphic system according to the aspect, it is preferable that the synapse devices are configured with a gated Schottky diode (GSD) having a charge storage layer or a nonvolatile memory device having a charge storage layer.

In the neuromorphic system according to the aspect, it is preferable that the forward neuron of the neuron layer includes a capacitor that is input with a current corresponding to a forward weighted value of the synapse array connected to an input terminal to be charged and a switching element that is turned on if a charging voltage of the capacitor is larger than a threshold voltage and outputs a firing spike signal, and if the current corresponding to the forward weighted value input from the synapse array is larger than the preset threshold voltage, the firing spike signal is generated, and the generated firing spike signal is output to the synapse array connected to the output terminal and the memory of the neuron layer.

In the neuromorphic system according to the aspect, it is preferable that the forward neuron of the final neuron layer includes a capacitor that is input with a current corresponding to a forward weighted value of the synapse array connected to an input terminal to be charged and a switching element that is turned on if a charging voltage of the capacitor is larger than a threshold voltage and outputs a firing spike signal, and if the current corresponding to the forward weighted value input from the synapse array is larger than the preset threshold voltage, the firing spike signal is generated, and the generated firing spike signal is output to the error calculation circuit connected to the output terminal.

In the neuromorphic system according to the aspect, it is preferable that each of the backward neuron of the neuron layer and the backward neuron of the final neuron layer includes a differential amplifier outputting a difference value between a voltage input from the synapse array or the error calculation circuit connected to an input terminal and a preset reference pulse and a level shifter adjusting a voltage level of the output signal of the differential amplifier, and an error signal is generated by pulse width-modulating a voltage corresponding to the backward weighted value of the synapse array connected to the input terminal or the error value of the error calculation circuit, and the generated error signal is output to the synapse array connected to the output terminal.

In the neuromorphic system according to the aspect, it is preferable that the backward neuron of the neuron layer is input with a current corresponding to the backward weighted value of the synapse array connected to the input terminal and an error generation signal from the memory of the neuron layer, and the error signal is generated by pulse width-modulating the input current by using the error generation signal, and the generated error signal is output to the synapse array connected to the output terminal.

In the neuromorphic system according to the aspect, it is preferable that the synapse array further includes an input switching element configured to switch an input terminal to one of an output terminal of a forward neuron of a pre-stage neuron layer, an output terminal of a memory of the pre-stage neuron layer, and an input terminal of a backward neuron of the pre-stage neuron layer, and an output switching element configured to switch an output terminal to one of an input terminal of a forward neuron of a post-stage neuron layer and an output terminal of a backward neuron of the post-stage neuron layer.

In the neuromorphic system according to the aspect, it is preferable that the neuromorphic system further comprises a controller controlling an operation of the input switching element and an operation of the output switching element, in forward propagation phase, the controller controls the input terminal of the synapse array to be connected to the output terminal of the forward neuron of the pre-stage neuron layer and controls the output terminal of the synapse array to be connected to the input terminal of the forward neuron of the post-stage neuron layer, in backward propagation phase, the controller controls the input terminal of the synapse array to be connected to the input terminal of the backward neuron of the pre-stage neuron layer and controls the output terminal of the synapse array to be connected to the output terminal of the backward neuron of the post-stage neuron layer, and in weighted value update phase, the controller controls the input terminal of the synapse array to be connected to the output terminal of the memory of the pre-stage neuron layer and controls the output terminal of the synapse array to be connected to the output terminal of the backward neuron of the post-stage neuron layer.

In the neuromorphic system according to the aspect, it is preferable that the memory of the neuron layer is input with the output signal of the forward neuron of the neuron layer, stores first information indicating whether or not the neuron is fired during a last time step for one image input extracted from the output signal of the forward neuron, and stores second information indicating whether or not the neuron is fired during the entire time steps for one image input extracted from the output signal of the forward neuron, the first information is used as a weighted value update signal, and the second information is used as an error generation signal of the backward neuron.

In the neuromorphic system according to the aspect, it is preferable that each of the backward neuron of the neuron layer and the backward neuron of the final neuron layer includes a first path configured with two inverter elements connected in series to an input terminal to output a positive error signal, and a second path configured with a single inverter element connected to the input terminal to output a negative error signal, and the positive error signal is output to a pre-stage synapse array though the first path, and the negative error signal is output to the pre-stage synapse array though the second path.

In the neuromorphic system according to the aspect, it is preferable that the backward neuron of the neuron layer is input with a current corresponding to the backward weighted value of the synapse array connected to the input terminal and an error generation signal from the memory of the neuron layer, and the positive error signal and the negative error signal are sequentially output to the pre-stage synapse array by using the error generation signal.

In the neuromorphic system according to the aspect, it is preferable that the synapse array further includes an input switching element configured to switch an input terminal to one of an output terminal of a forward neuron of a pre-stage neuron layer and an input terminal of a backward neuron of the pre-stage neuron layer, and an output switching element configured to switch an output terminal to one of an input terminal of a forward neuron of a post-stage neuron layer and an output terminal of a backward neuron of the post-stage neuron layer.

In the neuromorphic system according to the aspect, it is preferable that the neuromorphic system further comprises a controller controlling an operation of the input switching element and an operation of the output switching element, in forward propagation phase, the controller controls the input terminal of the synapse array to be connected to the output terminal of the forward neuron of the pre-stage neuron layer and controls the output terminal of the synapse array to be connected to the input terminal of the forward neuron of the post-stage neuron layer, in the backward propagation phase, the controller controls the input terminal of the synapse array to be connected to the input terminal of the backward neuron of the pre-stage neuron layer and controls the output terminal of the synapse array to be connected to the output terminal of the back ward neuron of the post-stage neuron layer, and in weighted value update phase, controller controls the input terminal of the synapse array to be connected to the output terminal of the forward neuron of the pre-stage neuron layer and controls the output terminal of the synapse array to be connected to the output terminal of the backward neuron of the post-stage neuron layer.

In the neuromorphic system according to the aspect, it is preferable that the memory of the neuron layer is input with the output signal of the forward neuron of the neuron layer and stores information indicating whether or not the neuron is fired during the entire time steps for one image input extracted from the input signal of the forward neuron, and the information is used as an error generation signal of the backward neuron.

The present invention having the above-described configuration implements a synapse array with a GSD having a charge storage layer or a memory device having a charge storage layer, so that it is possible to reduce power consumption as compared with neuromorphic-systems using devices such as Op-Amp, ADC, DAC, and the like in the related art.

The neuromorphic system according to the invention enables on-chip training by performing all of the forward propagation phase, the backward propagation phase, and the weighted value update phase of the neural network by using the synapse arrays and the neuron layers.

BRIEF DESCRIPTION OF THE DRAWINGS

FIG. 2 is a configuration diagram illustrating a neuromorphic system enabling on-chip training according to a first embodiment:

DETAILED DESCRIPTION OF THE PREFERRED EMBODIMENTS

Figures 1A, 1B:
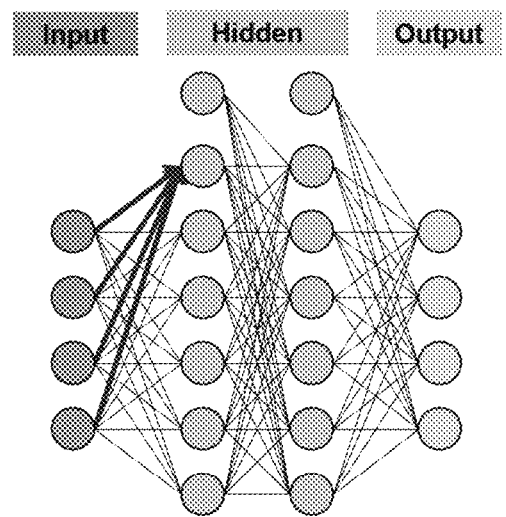
FIGS. 1A and 1B are a diagram of a neural network and a table illustrating signals in a hardware-based neural network.

The invention relates to a hardware-based neural network (HNNs) system enabling on-chip training. FIGS. 1A and 1B are a diagram of a neural network and a diagram illustrating signals in the hardware-based neural network. Referring to FIG. 1A, a hardware-based neuromorphic system includes an input neuron layer, at least one hidden neuron layer, and an output neuron layer. The neuron layers are connected to each other by synapse arrays having conductances that represent weights. FIG. 1B is a table illustrating input signals, weights, and vector-by-matrix multiplication (VMM) in the hardware-based neural network structure using software-based neural network models and synapse arrays. In the hardware-based neural network, in order to represent the weight, conductance G of a single device can be used, or a difference between conductances of a pair of devices ($G^+$-$G^-$) can be used. When a pair of devices is used in order to represent the weight, a weight having a range of from a negative value to a positive value can be implemented.

Hereinafter, the neuromorphic system enabling on-chip training according to embodiments of the invention will be described in detail with reference to the accompanying drawings.

First Embodiment

FIG. 2 is a configuration diagram illustrating a neuromorphic system enabling on-chip training according to a first embodiment. Referring to FIG. 2, the neuromorphic system 1 enabling on-chip training according to the first embodiment includes an input layer 10, one or more synapse arrays 20, 21, and 22, one or more neuron layers 30 and 31 arranged between the synapse arrays, a final neuron layer 39 connected to an output terminal of a last synapse array, and an error calculation circuit 40. The neuromorphic system according to the invention having the above-described configuration enables the on-chip training to optimize weights by sequentially executing a forward propagation phase, a backward propagation phase and a weighted value update phase. Hereinafter, a configuration and operation of each of components described above will be described in detail. In this specification, as illustrated in FIG. 2, the neuromorphic system configured with three synapse arrays and two neuron layers is exemplified. These numbers are only specific settings of the number of synapse arrays and the number of neuron layers for the convenience of description, and thus, the number of synapse arrays and the number of neuron layers can be appropriately modified according to the design of the system.

In FIG. 2, X indicates an output signal of the input layer or the forward neuron. O indicates a forward weighted value as an output signal of the synapse array. M indicates firing information for a last time step stored in a memory and is used as a weighted value update signal for the synapse array. G indicates firing information for entire time steps stored in the memory and is used as an error generation signal for a backward neuron. T indicates a target signal that is a correct answer signal. BO indicates an error value of the error calculation circuit or a backward weighted value of the synapse array. BX indicates an error signal that is an output signal of the backward neuron. UX indicates an error signal of a backward neuron supplied to a synapse array for use in the weighted value update phase. BX and UX are the same signal.

The input layer 10 is configured to be switched to one of an input signal X to be trained and an update signal M and configured to supply the switched signal to an input terminal of the synapse array by using switching elements. The input layer is switched so that the input signal X is supplied to the synapse array in the forward propagation phase and is switched so that the update signal M is supplied to the synapse array in the update phase.

Figure 3A:
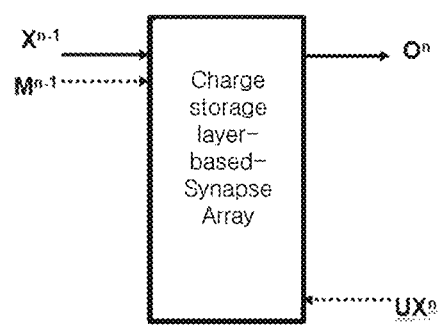
FIGS. 3A to 3C are a schematic diagram illustrating a first synapse array in the neuromorphic system according to the first embodiment.
Figure 3B:
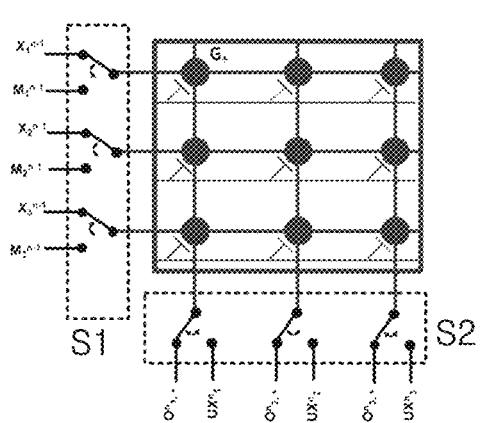
Figure 3C:
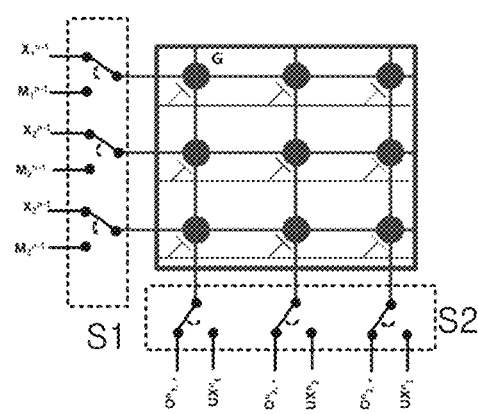
Figure 4A:
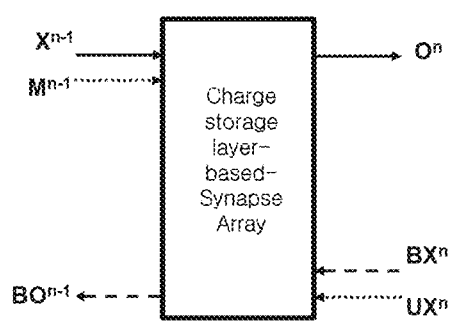
FIGS. 4A to 4C are a schematic diagram illustrating second and subsequent synapse arrays.
Figure 4B:
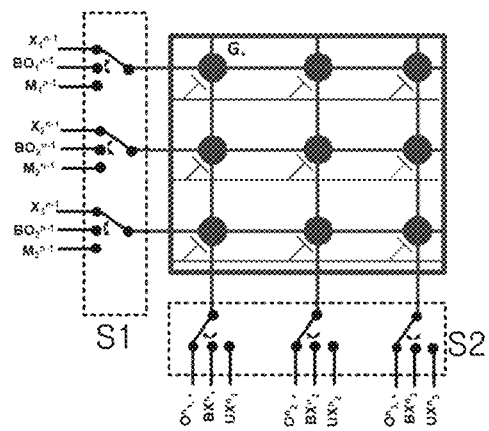
Figure 4C:
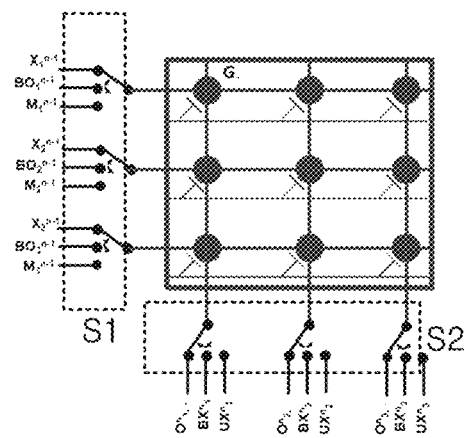

FIG. 3 is a schematic diagram illustrating a first synapse array in the neuromorphic system according to the first embodiment. FIG. 4 is a schematic diagram illustrating second and subsequent synapse arrays. It is preferable that, in the synapse arrays 20, 21, and 22, synapse devices performing a synapse function are arranged along rows and columns and connected in a cross-bar shape, and each synapse device is configured with a device having a charge storage layer. The synapse device may be configured with a gated Schottky diode (GSD) including a charge storage layer or may be configured with a nonvolatile memory device including a charge storage layer, a flash device including a charge storage layer, or the like.

The synapse device is programmed or erased to store or deplete charges in the charge storage layer of the synapse device, so that conductance of each synapse device is changed. Accordingly, it is possible to implement synapse devices having conductances corresponding to the weights. Hereinafter, for the convenience of description, the neuron layer connected to the input terminals of the synapse arrays is referred to as a pre-stage neuron layer, and the neuron layer connected to the output terminals of the synapse arrays is referred to as a post-stage neuron layer.

Referring to FIGS. 3 and 4, each of the synapse arrays includes an input switching element S1 connected to the input terminal and an output switching element S2 connected to the output terminal. The input switching element S1 is configured in which the input terminal of the synapse array is switched to one of the output terminal of the forward neuron of the pre-stage neuron layer, the output terminal of the memory of the pre-stage neuron layer, and the input terminal of the backward neuron of the pre-stage neuron layer. The output switching element S2 is configured in which the output terminal of the synapse array is switched to one of the input terminal of the forward neuron of the post-stage neuron layer and the output terminal of the backward neuron of the post-stage neuron layer. However, since the first synapse array illustrated in FIG. 3 does not perform the backward propagation phase, the input switching element is configured in which the input terminal of the synapse array is switched to one of the output terminal of the forward neuron of the pre-stage neuron layer, and the output terminal of the memory of the pre-stage neuron layer.

The neuromorphic system according to the invention may further include a controller controlling the operation of the input switching element and the operation of the output switching element. The controller may be implemented by using a microcontroller or a microprocessor such as an MCU.

In the forward propagation phase, the controller controls the input terminal of the synapse array to be connected to the output terminal of the forward neuron of the pre-stage neuron layer and controls the output terminal of the synapse array to be controlled to the input terminal of forward neuron of the post-stage neuron layer, so that in the synapse array a firing spike signal X is input from the forward neuron of the pre-stage neuron layer and the forward weighted value is output to the forward neuron of the post-stage neuron layer.

In addition, in the backward propagation phase, the controller controls the input terminal of the synapse array to be connected to the output terminal of the backward neuron of the pre-stage neuron layer and controls the output terminal of the synapse array to be connected to the output terminal of the backward neuron of the post-stage neuron layer, so that the error signal BX is input from the backward neuron of the post-stage neuron layer to the synapse array. A backward weighted value BO is output to the backward neuron of the pre-stage neuron layer.

In addition, in the weighted value update phase, the controller controls the input terminal of the synapse array to be connected to the output terminal of the memory of the pre-stage neuron layer and controls the output terminal of the synapse array to be connected to the output terminal of the backward neuron of the post-stage neuron layer, so that the update signal M is input from the memory of the pre-stage neuron layer to the synapse array and the error signal UX is input from the backward neuron of the post-stage neuron layer, and thus, the weight for the synapse device is updated.

On the other hand, it is preferable that one synapse array is configured with a first synapse array including synapse devices having positive conductance G+ and a second synapse array including synapse devices having negative conductance G−. FIGS. 3A to 3B and FIGS. 4B and 4C illustrate a first synapse array having a positive conductance and a second synapse array having a negative conductance, respectively.

The neuron layers 30 and 31 are arranged between the synapse arrays, respectively, and are configured to perform a forward propagation operation, a backward propagation operation, and a weighted value update operation with respect to the synapse arrays, and each of the neuron layers includes a forward neuron 300, a memory 310, and a backward neuron 320. Hereinafter, for the convenience of description, the synapse array connected to the input terminals of the neuron layers is referred to as a pre-stage synapse array, and the synapse array connected to the output terminals of the neuron layer is referred to as a post-stage synapse array.

Figure 5A:
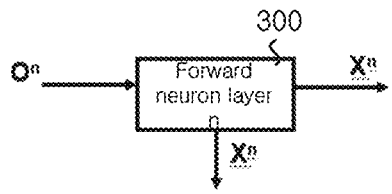
FIGS. 5A to 5C are a circuit diagram illustrating a forward neuron 300 in the neuromorphic system according to the first embodiment.
Figure 5B:
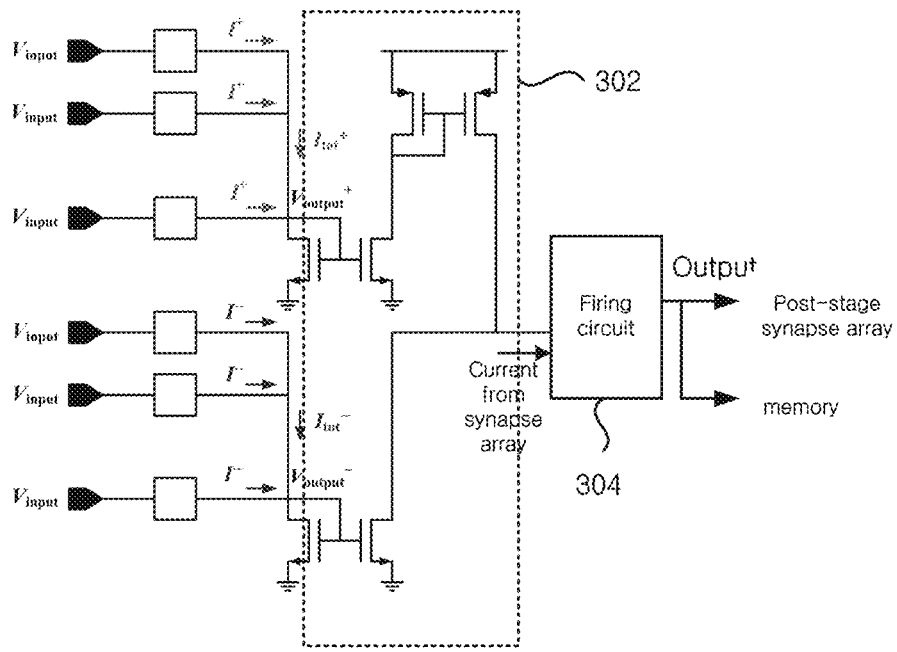
Figure 5C:
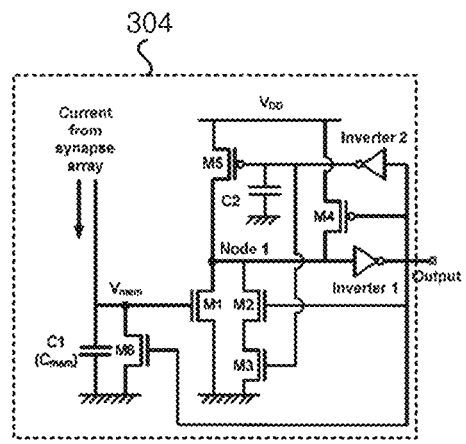

FIGS. 5A to 5C are a circuit diagram illustrating the forward neuron 300 in the neuromorphic system according to the first embodiment. Referring to FIG. 5A, in the forward propagation phase, the forward neuron 300 is input with the forward weighted value O output from the pre-stage synapse array, generates the output signal X according to the input forward weighted value and outputs the output signal to post-stage synapse circuit and memory. If the input forward weighted value is larger than a preset reference value, the forward neuron performs firing, generates the firing spike signal (post synaptic spike), and outputs the firing spike signal as the output signal X to the post-stage synapse array and the memory.

Referring to FIG. 5B, the forward neuron 300 is configured with a current mirror circuit 302 and a firing circuit 304, and a current corresponding to the forward weighted value output from the pre-stage synapse array is input to the firing circuit 304 through the current mirror circuit 302. If an input voltage is larger than a preset threshold voltage, the firing circuit 304 generates the firing spike signal and outputs the firing spike signal as the output signal.

The firing circuit 304 includes a membrane capacitor Cmem and a leakage element M6 connected in parallel with each other, a switching element M1 having the preset threshold voltage, and an inverter Inverter 1 connected to a source node Node 1 of the switching element. The output signal of the inverter is supplied to an output node and the leakage element M6. The capacitor is charged with an input current, and the switching element is configured to be turned on if the charging voltage of the capacitor is larger than the threshold voltage. In the firing circuit having the above-described configuration, the membrane capacitor Cmem is charged with a current corresponding to the sum of weights input from the pre-stage synapse array. If a resulting membrane voltage Vmem exceeds the threshold voltage of the switching element M1, a signal of 0 is applied to the inverter Inverter 1. The output node outputs a signal of 1, which becomes the firing spike signal. The signal of 1 from the output node is applied to the gate of the leakage element M6 to turn on the leakage element M6 to initialize the membrane voltage Vmem. The leakage element M6 may be configured with a resistor, an FET, or a nonvolatile memory device (with an adjustable threshold voltage), and a leakage path is generated at a membrane node.

Figure 6:
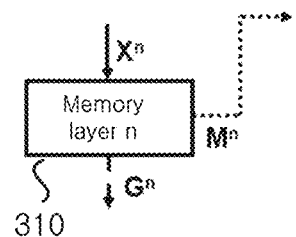
FIG. 6 is a block diagram illustrating a memory 310 in the neuromorphic system according to the first embodiment.

FIG. 6 is a block diagram illustrating the memory 310 in the neuromorphic system according to the first embodiment. Referring to FIG. 6, if the output signal X is input from the forward neurons of the neuron layer, the memory 310 extracts and stores first information and second information from the output signals of the forward neurons. The first information is information indicating whether or not the neuron is fired during the last time step among the entire time steps for one image input, is an activation value of the forward propagation phase, and is used as a weighted value update signal M.

The second information is information indicating whether or not the neuron is fired during the entire time steps for one image input, is a differential value of an activation function, and is used as an error generation signal G of the backward neuron.

On the other hand, the weighted value update signal M used as an activation value of the forward propagation phase can increase the number of firing spike signals to be stored by increasing the memory usage.

Even if the memory usage increases in this manner, more precise weighted value update can be performed by increasing the number of firing spike signals used as the weighted value update signals M.

Figure 8A:
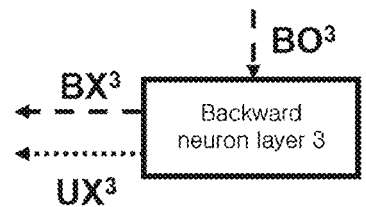
FIGS. 8A to 8C are a block diagram illustrating a backward neuron 320 of each neuron layer in the neuromorphic system according to the first embodiment.
Figure 8B:
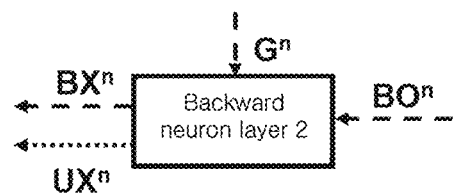
Figure 8C:
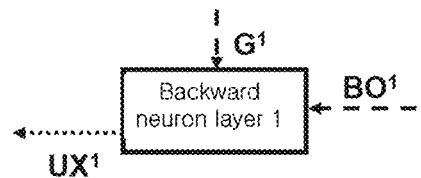

FIGS. 8A to 8C are block diagrams illustrating the backward neurons 320 of the neuron layers in the neuromorphic system according to the first embodiment. FIG. 8A illustrates the backward neuron of the final neuron layer. FIG. 8B illustrates a backward neuron of an intermediate neuron layer. FIG. 8C illustrates a backward neuron of the first neuron layer.

Referring to FIG. 8A, the backward neuron of the final neuron layer is input with the error value BO supplied from the error calculation circuit, and accordingly, in the backward propagation phase and the weighted value update phase, the respective error signals BX and UX are output and supplied to the output terminal of the pre-stage synapse array. Referring to FIG. 8B, in the backward propagation phase, the backward neuron of the intermediate neuron layer is input with the backward weighted value BO input from the post-stage synapse array and the error generation signal G stored in the memory, and in the backward propagation phase and the weighted value update phase, the respective error signals BX and UX are output and supplied to the output terminal of the pre-stage synapse array. Referring to FIG. 8C, in the backward propagation phase, the backward neuron of the first neuron layer is input with the backward weighted value BO input from the post-stage synapse array and the error generation signal G stored in the memory, and accordingly, in the weighted value update phase, the error signal UX is output and supplied to the output terminal of the pre-stage synapse array.

The backward neuron in the neuromorphic system according to the first embodiment is configured with a pulse width modulation (PWM) circuit to pulse width modulation the error value, which is an input signal, to generate the error signal and output the error signal. FIG. 9 is a circuit diagram illustrating a pulse width modulation circuit of the backward neuron 320 in the neuromorphic system according to the first embodiment.

Figure 9A:
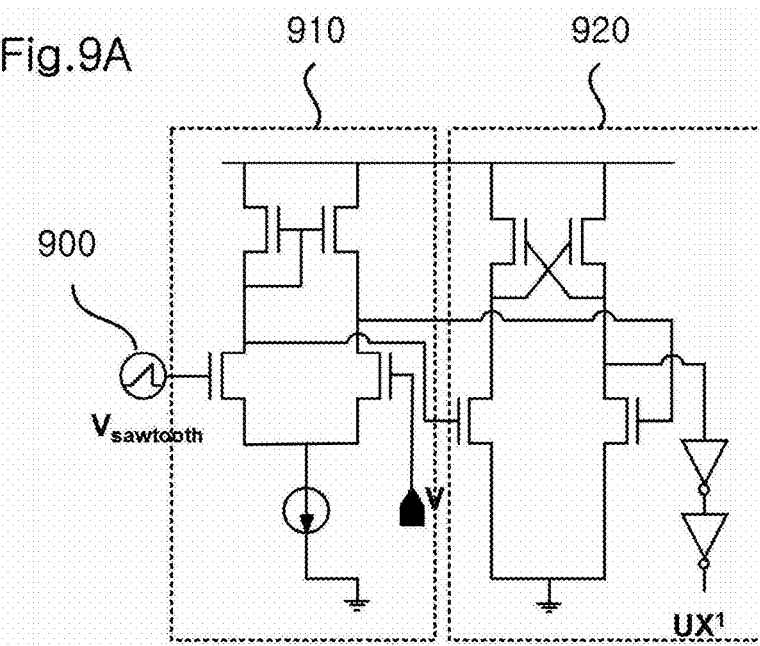
FIGS. 9A and 9B are a circuit diagram illustrating a pulse width modulation circuit of the backward neuron 320 in the neuromorphic system according to the first embodiment.

Referring to FIG. 9A, the pulse width modulation (PWM) circuit is a circuit that converts an input voltage into a pulse width having a constant voltage and outputs the pulse width, and PWM circuit includes a reference pulse generation unit (sawtooth wave generator) 900, a differential amplifier 910, and a level shifter 920. The backward neuron according to the embodiment is configured with the pulse width modulation circuit to form a sawtooth wave that is a reference voltage pulse, compare a magnitude of the sawtooth wave with a magnitude of the voltage applied to an X node. If the sawtooth wave is larger than the voltage of the X node, the backward neuron generates 0, and if not, the backward neuron generates 1, so that the pulse width of the output voltage is adjusted accordingly. The comparator of the PWM circuit is configured with a combination of a CMOS and a double gate MOSFET or a positive feedback (PF) element and compares the input voltage with a reference signal.

Figure 9B:
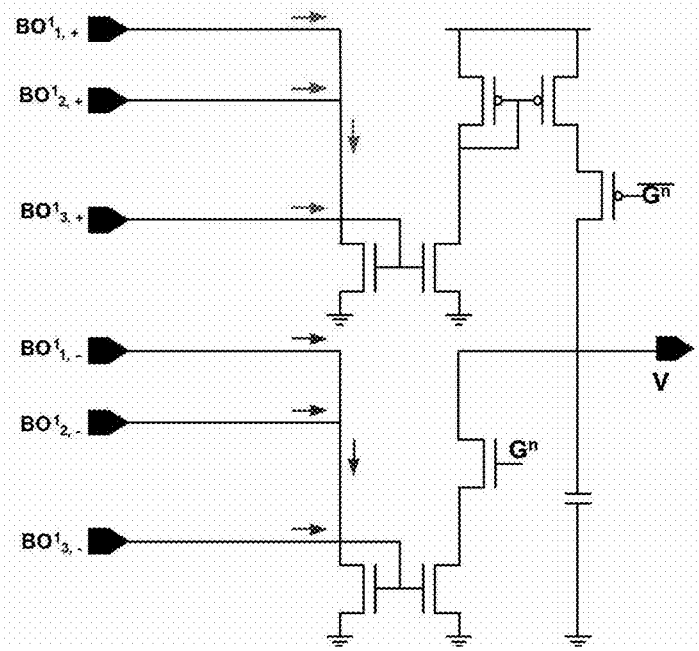

FIG. 9B is a circuit diagram illustrated in order to explain the input voltage V of the backward neuron configured with the pulse width modulation circuit illustrated in FIG. 9A. As illustrated in FIG. 9B, the input voltage V applied to the backward neuron is a membrane voltage output from the membrane capacitor which is charged with a current corresponding to the backward weighted value of the post-stage synapse array and is configured so that an error generation signal Gn is applied to the output terminal of the current mirror.

The final neuron layer 39 is connected to the synapse array arranged as the last position, is configured to perform the forward propagation operation and the backward propagation operation for the last synapse array, and includes the forward neuron 390 and the backward neuron 392. In the forward propagation phase, the forward neuron 390 of the final neuron layer 39 is input with a forward weighted value O3 output from the last synapse array, and if the input forward weighted value is larger than a preset threshold value, the forward neuron performs firing, generates a firing spike signal (post synaptic spike) X3, and outputs the firing spike signal to the error calculation circuit 40. In the backward propagation phase, the backward neuron 392 of the final neuron layer 39 generates an error signal BX3 by using the error value BO supplied from the error calculation circuit and supplies the error signal BX3 to the output terminal of the last synapse array. The configuration of the forward neuron and the backward neuron of the final neuron layer is the same as that of the forward neuron and the backward neuron of the intermediate neuron layer, except that the input signal is partially different.

Figure 7A:
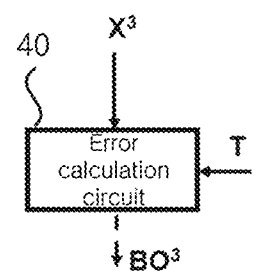
FIGS. 7A and 7B are a circuit diagram illustrating an error calculation circuit 40 in the neuromorphic system according to the first embodiment.
Figure 7B:
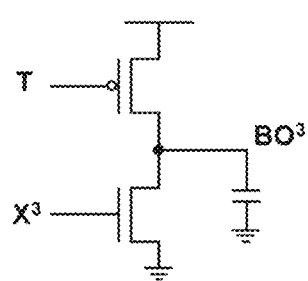

The error calculation circuit 40 is input with a target signal T which is the correct answer signal and the output signal of the forward neuron of the final neuron layer. The error value BO between the input target signal and the input output signal of the final neuron layer is detected and supplied to the backward neuron 392 of the final neuron layer 39. The error calculation circuit may be configured with a comparator, an operational amplifier, a differential amplifier, or the like and may be configured with a combination of an FET and a capacitor. FIG. 7 is a circuit diagram illustrating the error calculation circuit 40 in the neuromorphic system according to the first embodiment. Referring to FIG. 7, the error calculation circuit may be configured with two FET elements connected in series.

Hereinafter, the operations of the neuromorphic system according to the first embodiment having the above-described configuration will be described. For the on-chip training, the neuromorphic system according to the invention may sequentially perform the forward propagation phase, the backward propagation phase, and the weighted value update phase or may selectively perform the forward propagation phase, the backward propagation phase, and the weighted value update phase under the control of the controller.

First, the operation of the forward propagation phase of the neuromorphic system according to the first embodiment will be described in detail.

In the forward propagation phase, voltage spike signals H1, H2, and H3 are generated in the input layer and applied as input signals to the first synapse array. Each synapse array outputs a current corresponding to the forward weighted value according to the input signal supplied from the input layer or the forward neuron of the pre-stage neuron layer and supplies the current to the forward neuron of the post-stage neuron layer. In this case, the output signal of the synapse array is supplied in a direction orthogonal to the direction in which the input signal is applied.

The current corresponding to the forward weighted value is input from the pre-stage synapse array to the forward neurons of each neuron layer, and the input current is supplied to the firing circuit through the current mirror circuit. The membrane capacitor of the firing circuit is charged with the current corresponding to the forward weighted value. If the membrane voltage due to the charging of the membrane capacitor with respect to the firing circuit exceeds the preset threshold voltage, the firing spike signal is generated and output, and the membrane voltage of the membrane node is initialized by using the leakage element.

The firing spike signal generated by the forward neuron is applied to the input terminal of the post-stage synapse array. The above-described forward propagation phase is repeated by the synapse arrays and the neuron layers connected in series, so that the firing spike signals are transmitted to the forward neurons of the final neuron layer.

On the other hand, the forward neuron of each neuron layer applies output signals to the post-stage synapse array and, at the same time, outputs the output signals to the memory 310 of the neuron layer for the backward propagation phase and the weighted value update phase. If the output signals X including the firing spike signal are supplied from the forward neuron, the memory extracts the firing information of the last time step and the firing information of the entire time steps for one image input and stores the firing information as the weighted value update signal M and the error generation signal G.

The forward neuron of the final neuron layer is input with a current corresponding to the forward weighted value output from the last synapse array. The resulting output signal is output to the error calculation circuit 40.

The error calculation circuit compares the output signal supplied from the forward neuron of the final neuron layer with the target signal which is the correct answer signal, obtains the error value, and outputs the error value to the backward neuron of the final neuron layer.

Accordingly, a voltage value corresponding to the difference between the number of target spikes constituting the target signal and the number of firing spikes included in the output signal of the final neuron layer is supplied as the error value to the backward neurons of the final neuron layer. Hereinafter, the operation of the backward propagation phase of the neuromorphic system according to the first embodiment will be described in detail.

In the backward propagation phase, the input terminal of each synapse array is switched to the input terminal of the backward neuron of the pre-stage neuron layer. The output terminal of each synapse array is switched to the output terminal of the backward neuron of the post-stage neuron layer. Therefore, the output signal of the backward neuron of each neuron layer is supplied to the output terminal of the pre-stage synapse array. As the backward weighted value of the synapse array is output to the backward neuron of the pre-stage neuron layer through the input terminal of the synapse array, the backward propagation of the system occurs.

The output value of the error calculation circuit is the error value represented as a voltage amplitude, and in the backward propagation phase, the error value is modulated in a pulse width by the backward neuron to be converted to an error signal represented as a pulse duration (that is, pulse width). The error value can be positive or negative, but since the pulse width is always positive. Therefore, the error value can be divided into a phase representing a positive error and a phase representing a negative error in the backward propagation phase. If the error value is positive, the error value is compared with a sawtooth wave having a positive slope, and the pulse width is proportional to the error value.

If the error value is negative, the error value is compared with a sawtooth wave having a negative slope, and the pulse width is proportional to the error value.

In the backward propagation phase, if the error value is input from the error calculation circuit, the backward neuron of the final neuron layer performs PWM modulation, generates a PWM error signal, and supplies the PWM error signal to the output terminal of the last synapse array.

And, a PWM-modulated error signal output from the backward neuron of the neuron layer is supplied to the output terminal of the pre-stage synapse array. In the backward propagation phase, if the error signal of the backward neuron is input to the output terminal of the synapse array, the propagation proceeds in the orthogonal direction of the output terminal of the synapse array, and the current corresponding to the backward weighted value is output to the input terminal of the synapse array. In this manner, in the backward propagation phase, signals are input and output in a direction opposite to the direction in the forward propagation phase of the synapse array.

The above-described backward propagation phase is repeated by the sequentially connected synapse arrays and neuron layers, so that the backward neurons of each neuron layer modulates the backward weighted values supplied from the post-stage synapse array, by the PWM modulation, so that the PWM error signal is generated.

The error signal of the backward neuron is propagated to the output terminal of the pre-stage synapse array. The current corresponding to the backward weighted value of the synapse array is supplied to the pre-stage neuron layer. However, when the differential value of the activation function of the neuron layer is 0, the membrane capacitor of the backward neuron of the neuron layer is turned off, and the backward weighted value cannot be obtained. Herein, as the differential value of the activation function, the error generation signal G stored in the memory of the neuron layer is used in the forward propagation phase. Therefore, only when the error generation signal of each neuron layer is 1, the backward weighted value of the synapse array is obtained, so that the PWM error signal by the backward neuron of the neuron layer is generated, and thus, the backward propagation proceeds.

In addition, when the positive error signal and the negative error signal propagate to the synapse array, the charging directions of the neuron layer into the capacitor become opposite to each other.

Figure 10:
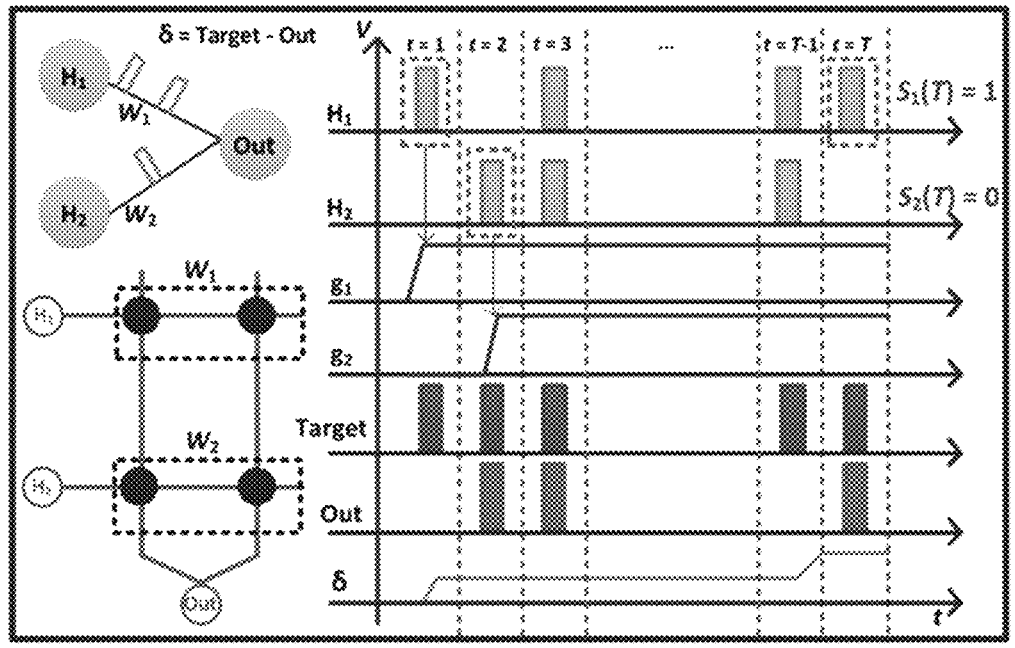
FIG. 10 is a diagram illustrating an on-chip training method for weight optimization in the neuromorphic system according to the first embodiment.

FIG. 10 is an exemplary diagram illustrating an on-chip training method for weight optimization in the neuromorphic system according to the first embodiment. Referring to FIG. 10, in the forward propagation phase, if the firing spike signals H1 and H2 of the neuron layer are generated, the activation values X1=S1(T) and X2=S2(T) and differential values g1 and g2 of the activation function are determined. In an ideal backward propagation algorithm, the weighted value update amount $\Delta w$ is calculated as an activation value X, an error value $\delta$, and a neural network training rate $\eta$, and thus, $\Delta w = \eta X \delta$.

The activation value can be obtained and stored in memory in the forward propagation phase.

Figure 12:
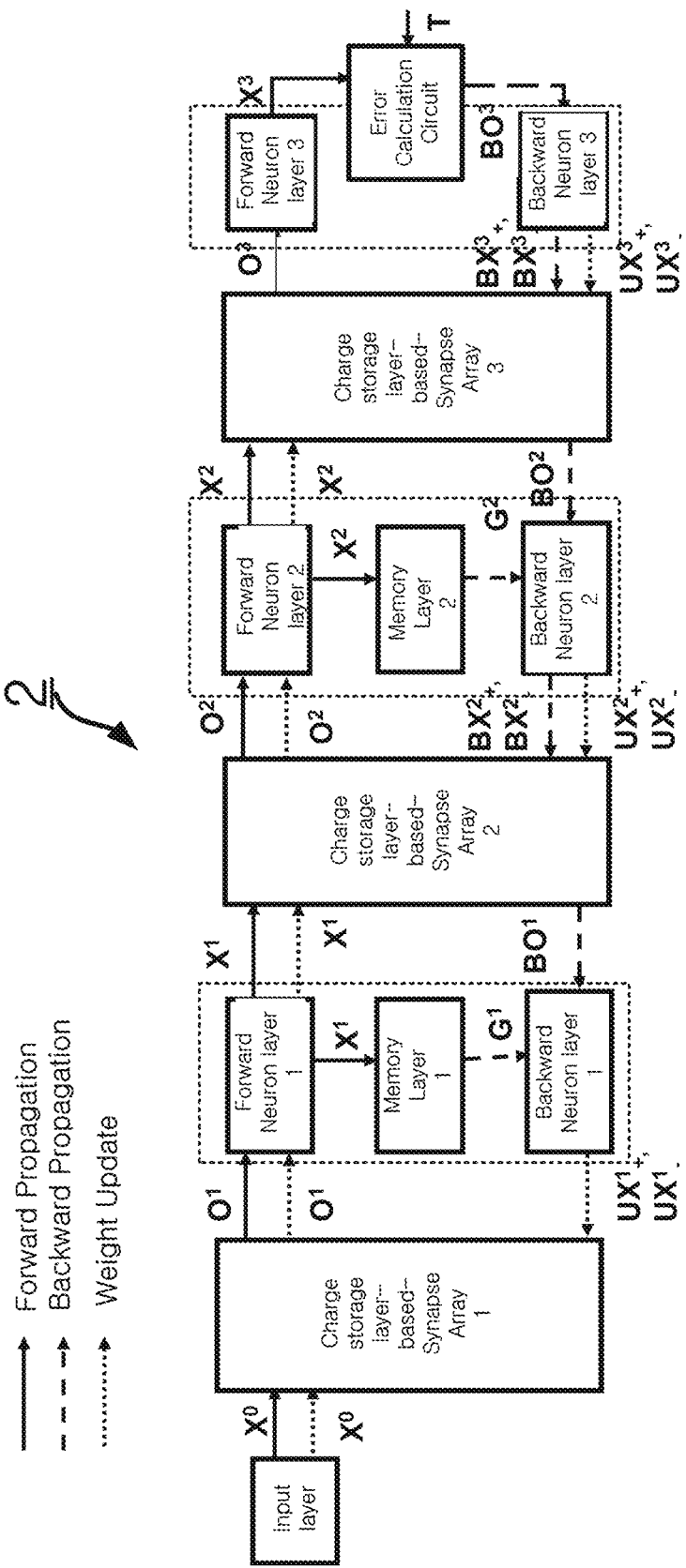
FIG. 12 is a block diagram illustrating a neuromorphic system enabling on-chip training according to a second embodiment.

In the prior art, since the activation value becomes the total number of firing spikes, a large amount of memory usage is required to accurately store the activation value, and thus, a large amount of power consumption and a large installation space are required. Therefore, the neuromorphic system according to the invention is characterized to store and use only the firing spike signal generated in the last time step of the forward propagation phase as the activation value in order to minimize the amount of the memory usage. Referring to FIG. 12, since the firing spike signal H1 is a firing spike signal existing at t=T, the activation value becomes 1. Since the firing spike signal H2 is not a firing spike signal existing at t=T, the activation value becomes 0.

On the other hand, the differential values g1 and g2 of the neuron activation function are signals determined according to whether or not a firing spike signal is generated during the forward propagation phase, and if the firing spike signal is generated at least once, the differential values become 1. The error value $\delta$ is configured with a difference value between the target signal T and the output signal Out of the final neuron layer.

Hereinafter, the operation of the weighted value update phase in the neuromorphic system according to the first embodiment will be described in detail.

In the weighted value update phase, each synapse device of the synapse array is programmed or erased by using the weighted value update signal M stored in the memory and the error signal obtained in the backward propagation phase, and the weight is updated by changing the conductance of the synapse device.

Figure 11:
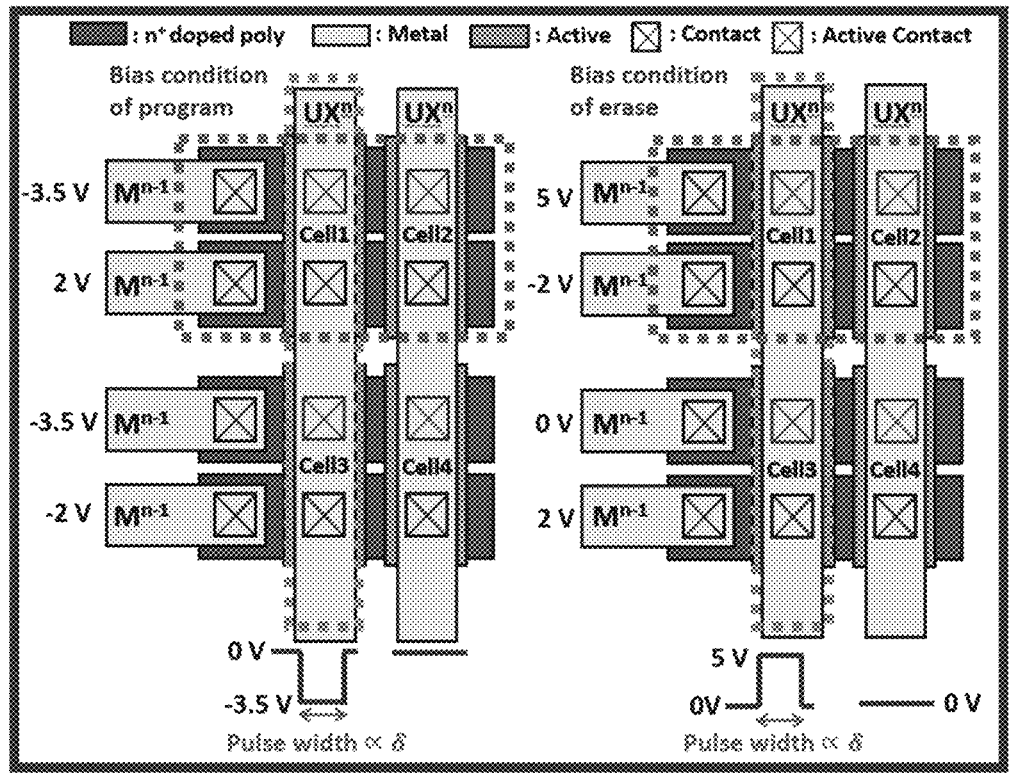
FIG. 11 is a diagram illustrating signals applied to the synapse arrays in a weighted value update phase in the neuromorphic system according to the first embodiment.

For the weighted value update of the synapse device, a program pulse or an erase pulse is applied to a control terminal of the synapse array. The weighted value update signal M is applied to the input terminal of the synapse array. An error signal UX generated by the backward neuron is applied to the output terminal of each synapse array, so that the conductance of the synapse device is allowed to be changed. FIG. 11 is a diagram illustrating signals applied to the synapse array in the neuromorphic system according to the first embodiment, in the weighted value update phase. Referring to FIG. 11, the weighted value update signal M is applied to the input terminal of the synapse array. The PWM error signal generated by the backward neuron is applied. A program or erase voltage pulse is applied to the control terminal.

Second Embodiment

Hereinafter, a configuration and operation of a neuromorphic system enabling on-chip training according to a second embodiment will be described in detail with reference to the accompanying drawings.

FIG. 12 is a block diagram illustrating the neuromorphic system enabling on-chip training according to the second embodiment.

Referring to FIG. 12, the neuromorphic system according to the second embodiment has a basic configuration similar to that of the neuromorphic system according to the first embodiment, but the error signals of the backward neurons of each neuron layer and the operations of the weighted value update phase are different. Therefore, only differences from the first embodiment will be described.

Similarly to the first embodiment, the neuromorphic system according to the second embodiment includes an input layer, one or more synapse arrays, one or more neuron layers arranged between the synapse arrays, a final neuron layer connected to the output terminal of the last synapse array, and an error calculation circuit.

The neuron layer of the neuromorphic system according to the second embodiment includes a forward neuron, a memory, and a backward neuron. The forward neuron is the same as that of the first embodiment. The memory is input with the output signal of the forward neuron. Information indicating whether or not the neuron is fired during the entire time steps is extracted from the output signal of the forward neuron and stored, and the information is used as the error generation signal G in the backward propagation phase.

Figure 13A:
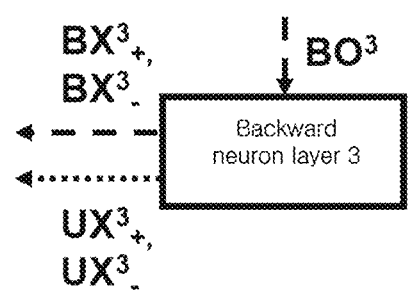
FIGS. 13A and 13B are a block diagram and a circuit diagram illustrating backward neurons of a final neuron layer in the neuromorphic system according to the second embodiment.
Figure 13B:
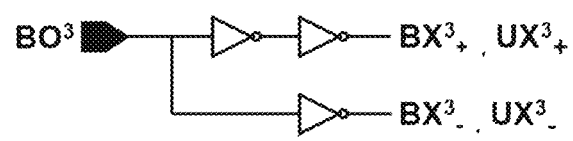

FIGS. 13A and 13B are a block diagram and a circuit diagram illustrating the backward neurons of the final neuron layer in the neuromorphic system according to the second embodiment. Referring to FIGS. 13A and 13B, the backward neuron of the final neuron layer according to the second embodiment is configured with a first path including two inverters connected in series to the input terminal to output BX+ and UX+ signals and a second path including a single inverter connected to the input terminal to output the BX− and UX− signals.

The backward neuron having the above-described configuration sequentially performs a positive backward propagation phase and a negative backward propagation phase through the first path and the second path. In the positive backward propagation phase, the backward neuron generates and outputs a positive error signal BX+ with respect to the error value BO through the first path. Subsequently, in the negative backward propagation phase, the backward neuron generates and outputs the negative error signal BX− with respect to the error value BO through the second path.

In the positive backward propagation phase, the positive error signal BX+ is applied to both a G+ synapse array and a G− synapse array. Accordingly, the G+ synapse array applies the output voltage in the direction in which the membrane capacitor of the backward neuron of the pre-stage neuron layer is charged, and the G− synapse array applies the output voltage in the direction in which the membrane capacitor of the backward neuron of the pre-stage neuron layer is discharged.

In the negative backward propagation phase, the negative error signal BX− is applied to both the G+ synapse array and the G− synapse array. Accordingly, the G+ synapse array applies the output voltage in the direction in which the membrane capacitor of the backward neuron of the pre-stage neuron layer is discharged, and the G− synapse array applies the output voltage in the direction in which the membrane capacitor of the backward neuron of the pre-stage neuron layer is charged. Although both BX+ and BX− signals are positive pulses through this connection, the positive pulses can represent positive and negative error signals, respectively.

Figure 14A:
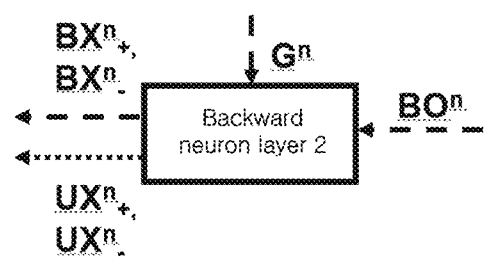
FIGS. 14A and 14B are a block diagram and a circuit diagram illustrating backward neurons of a neuron layer in the neuromorphic system according to the second embodiment.
Figure 14B:
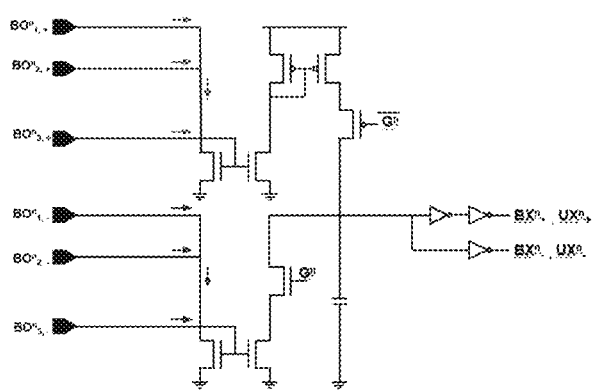

FIGS. 14A and 14B are a block diagram and a circuit diagram illustrating the backward neurons of the neuron layers in the neuromorphic system according to the second embodiment. Referring to FIG. 14, the backward neuron of the neuron layer is configured with the same circuit as the backward neuron of the final neuron layer described above. However, the current corresponding to the backward weighted value of the post-stage synapse array is applied as an input signal. The current mirror circuit for the input current is further added.

Therefore, in the backward neuron of the neuron layer, the error generation signal G is applied to the output terminal of the current mirror circuit. The positive backward propagation phase and the negative backward propagation phase are sequentially performed according to the current corresponding to the backward weighted value to sequentially output a positive error signal and a negative error signal.

In the neuromorphic system according to the second embodiment, in the weighted value update phase, the input terminal of the synapse array is connected to the output terminal of the forward neuron of the pre-stage neuron layer, and thus, the firing spike signal by the forward weighted value is input. The output terminal of the synapse array is connected to the output terminal of the backward neuron of the post-stage neuron layer, the error signal of the post-stage neuron layer is input, and the synapse device is programmed or erased, so that the conductance of the synapse device can be change.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A neuromorphic system enabling on-chip training, comprising:
   one or more synapse arrays in which synapse devices having a preset conductance are arranged in a cross-bar shape;
   an input layer the supplies an input signal to a first synapse array;
   a final neuron layer that includes a forward neuron configured to perform a forward propagation operation of a neural network and a backward neuron configured to perform a backward propagation operation of the neural network and is connected to an output terminal of a last synapse array;
   one or two or more neuron layers that include a forward neuron configured to perform the forward propagation operation of the neural network, a backward neuron configured to perform the backward propagation operation of the neural network, and a memory that stores signals used during a weighted value update operation of the neural network and being arranged between the remaining synapse arrays except for the first synapse array and the last synapse array; and
   an error calculation circuit that is input with a target signal and an output signal of the forward neuron of the final neuron layer and detects and outputs an error value between the input target signal and the input output signal of the final neuron layer,
   wherein conductances of the synapse devices represent weighted values of the neural network and are changed by the weighted value update operation, and
   wherein the synapse devices are configured with a gated Schottky diode (GSD) having a charge storage layer or a nonvolatile memory device having a charge storage layer.

2. The neuromorphic system according to claim 1, wherein the forward neuron of the neuron layer includes:
   a capacitor that is input with a current corresponding to a forward weighted value of the synapse array connected to an input terminal to be charged; and
   a switching element that is turned on if a charging voltage of the capacitor is larger than a threshold voltage and outputs a firing spike signal, and
   wherein, if the current corresponding to the forward weighted value input from the synapse array is larger than the preset threshold voltage, the firing spike signal is generated, and the generated firing spike signal is output to the synapse array connected to the output terminal and the memory of the neuron layer.

3. The neuromorphic system according to claim 1, wherein the forward neuron of the final neuron layer includes:
   a capacitor that is input with a current corresponding to a forward weighted value of the synapse array connected to an input terminal to be charged; and
   a switching element that is turned on if a charging voltage of the capacitor is larger than a threshold voltage and outputs a firing spike signal, and
   wherein, if the current corresponding to the forward weighted value input from the synapse array is larger than the preset threshold voltage, the firing spike signal is generated, and the generated firing spike signal is output to the error calculation circuit connected to the output terminal.

4. The neuromorphic system according to claim 1,
wherein each of the backward neuron of the neuron layer and the backward neuron of the final neuron layer includes:
a differential amplifier outputting a difference value between a voltage input from the synapse array or the error calculation circuit connected to an input terminal and a preset reference pulse; and
a level shifter adjusting a voltage level of the output signal of the differential amplifier,
wherein an error signal is generated by pulse width-modulating a voltage corresponding to the backward weighted value of the synapse array connected to the input terminal or the error value of the error calculation circuit, and the generated error signal is output to the synapse array connected to the output terminal.

5. The neuromorphic system according to claim 4,
wherein the backward neuron of the neuron layer is input with a current corresponding to the backward weighted value of the synapse array connected to the input terminal and an error generation signal from the memory of the neuron layer, and
wherein the error signal is generated by pulse width-modulating the input current by using the error generation signal, and the generated error signal is output to the synapse array connected to the output terminal.

6. The neuromorphic system according to claim 1,
wherein the synapse array further includes:
an input switching element configured to switch an input terminal to one of an output terminal of a forward neuron of a pre-stage neuron layer, an output terminal of a memory of the pre-stage neuron layer, and an input terminal of a backward neuron of the pre-stage neuron layer; and
an output switching element configured to switch an output terminal to one of an input terminal of a forward neuron of a post-stage neuron layer and an output terminal of a backward neuron of the post-stage neuron layer.

7. The neuromorphic system according to claim 6,
further comprising: a controller controlling an operation of the input switching element and an operation of the output switching element,
wherein, in forward propagation phase, the controller controls the input terminal of the synapse array to be connected to the output terminal of the forward neuron of the pre-stage neuron layer and controls the output terminal of the synapse array to be connected to the input terminal of the forward neuron of the post-stage neuron layer,
wherein, in backward propagation phase, the controller controls the input terminal of the synapse array to be connected to the input terminal of the backward neuron of the pre-stage neuron layer and controls the output terminal of the synapse array to be connected to the output terminal of the backward neuron of the post-stage neuron layer, and
wherein, in weighted value update phase, the controller controls the input terminal of the synapse array to be connected to the output terminal of the memory of the pre-stage neuron layer and controls the output terminal of the synapse array to be connected to the output terminal of the backward neuron of the post-stage neuron layer.

8. The neuromorphic system according to claim 1,
wherein the memory of the neuron layer is input with the output signal of the forward neuron of the neuron layer, stores first information indicating whether or not the neuron is fired during a last time step for one image input extracted from the output signal of the forward neuron, and stores second information indicating whether or not the neuron is fired during the entire time steps for one image input extracted from the output signal of the forward neuron,
wherein the first information is used as a weighted value update signal, and
wherein the second information is used as an error generation signal of the backward neuron.

9. The neuromorphic system according to claim 1,
wherein each of the backward neuron of the neuron layer and the backward neuron of the final neuron layer includes:
a first path configured with two inverter elements connected in series to an input terminal to output a positive error signal; and
a second path configured with a single inverter element connected to the input terminal to output a negative error signal, and
wherein the positive error signal is output to a pre-stage synapse array though the first path, and the negative error signal is output to the pre-stage synapse array though the second path.

10. The neuromorphic system according to claim 9,
wherein the backward neuron of the neuron layer is input with a current corresponding to the backward weighted value of the synapse array connected to the input terminal and an error generation signal from the memory of the neuron layer, and
wherein the positive error signal and the negative error signal are sequentially output to the pre-stage synapse array by using the error generation signal.

11. The neuromorphic system according to claim 1,
wherein the synapse array further includes:
an input switching element configured to switch an input terminal to one of an output terminal of a forward neuron of a pre-stage neuron layer and an input terminal of a backward neuron of the pre-stage neuron layer; and
an output switching element configured to switch an output terminal to one of an input terminal of a forward neuron of a post-stage neuron layer and an output terminal of a backward neuron of the post-stage neuron layer.

12. The neuromorphic system according to claim 11,
further comprising: a controller controlling an operation of the input switching element and an operation of the output switching element,
wherein, in forward propagation phase, the controller controls the input terminal of the synapse array to be connected to the output terminal of the forward neuron of the pre-stage neuron layer and controls the output terminal of the synapse array to be connected to the input terminal of the forward neuron of the post-stage neuron layer,
wherein, in the backward propagation phase, the controller controls the input terminal of the synapse array to be connected to the input terminal of the backward neuron of the pre-stage neuron layer and controls the output terminal of the synapse array to be connected to the output terminal of the backward neuron of the post-stage neuron layer, and
wherein, in weighted value update phase, controller controls the input terminal of the synapse array to be connected to the output terminal of the forward neuron of the pre-stage neuron layer and controls the output terminal of the synapse array to be connected to the output terminal of the backward neuron of the post-stage neuron layer.

13. The neuromorphic system according to claim 1,
wherein the memory of the neuron layer is input with the output signal of the forward neuron of the neuron layer and stores information indicating whether or not the neuron is fired during the entire time steps for one image input extracted from the input signal of the forward neuron, and
wherein the information is used as an error generation signal of the backward neuron.

\* \* \* \* \*